United States Patent [19]

Yorikane

[11] Patent Number: 4,477,038

[45] Date of Patent: Oct. 16, 1984

[54] CLICK DEVICE WITH A LINE SAGGING PREVENTION MECHANISM FOR A FISHING REEL

[75] Inventor: Toshiaki Yorikane, Hiroshima, Japan

[73] Assignee: Ryobi Ltd., Hiroshima, Japan

[21] Appl. No.: 427,034

[22] Filed: Sep. 29, 1982

[30] Foreign Application Priority Data

Nov. 3, 1981 [JP] Japan .................... 56/164605[U]

[51] Int. Cl.³ ................... A01K 89/01; A01K 89/02
[52] U.S. Cl. ....................... 242/84.21 R; 74/577 S
[58] Field of Search .............. 242/84.2 R, 84.21 R, 242/84.1 R, 84.51 R, 211, 212, 219, 220; 188/82.3, 82.34, 82.4; 74/577 R, 577 S

[56] References Cited

U.S. PATENT DOCUMENTS

| | | | |
|---|---|---|---|
| 996,348 | 6/1911 | Kramer | 242/84.51 R |
| 4,088,279 | 5/1978 | Karlsson et al. | 242/84.1 R |
| 4,163,528 | 8/1979 | Egasaki et al. | 242/84.51 A |

*Primary Examiner*—Billy S. Taylor
*Attorney, Agent, or Firm*—Sughrue, Mion, Zinn, Macpeak & Seas

[57] ABSTRACT

A spinning reel includes an anti-reverse mechanism for selectively preventing a rotor from rotating in a reverse direction, and a click device for selectively producing clicks when the rotor rotates in the reverse or forward direction. The click device includes a click pawl engageable with a click gear rotatable with the rotor to produce clicks, a switch lever for enabling the click pawl to engage with and disengage from the click gear, and a brake lever for keeping the click pawl engaging the click gear when the rotor rotates in the reverse direction. Clicks can be generated as desired when the rotor rotates in the forward or reverse direction. When the rotor rotates in the reverse direction, the click pawl is caused by the brake lever to engage the click gear to produce clicks and simultaneously resist the reverse rotation of the rotor.

4 Claims, 5 Drawing Figures

CLICK DEVICE WITH A LINE SAGGING PREVENTION MECHANISM FOR A FISHING REEL

BACKGROUND OF THE INVENTION

The present invention relates to a click device having a line sagging prevention mechanism for a spinning fishing reel.

Spinning reels are generally equipped with an anti-reverse mechanism for selectively preventing a rotor from rotating in a reverse direction and a click mechanism for generating clicks when the rotor rotates in forward and reverse directions. Some anglers prefer clicks while the fishing line is being wound up, and some do not.

SUMMARY OF THE INVENTION

Therefore, it is an object of the present invention to provide a spinning reel having a click device for selectively producing clicks as desired when the rotor rotates in a forward or reverse direction to wind up or reel out the line.

Another object of the present invention is to provide a spinning reel having a click device which serves as a line sagging prevention mechanism for resisting reverse rotation of the rotor when the line is reeled out, so that the line can be prevented from sagging.

According to the present invention, a spinning reel comprises a click device composed a click gear rotatably mounted on a tubular shaft for rotation with a rotor, a click pawl pivotably mounted on a plate of a reel body for engagement with the click gear to produce clicks, a switch lever pivotably mounted on the plate, and a brake lever pivotably mounted on the plate and engageable with the click pawl. A first spring acts between the click pawl and the switch lever for enabling the click pawl to engage with and disengage from the click gear in response to actuation of the switch lever, and a second spring acts between the plate and the brake lever for causing the brake lever to engage the click pawl when the rotor rotates in a reverse direction while the click pawl engages the click gear, whereby the rotor can be resisted in its rotation in the reverse direction.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
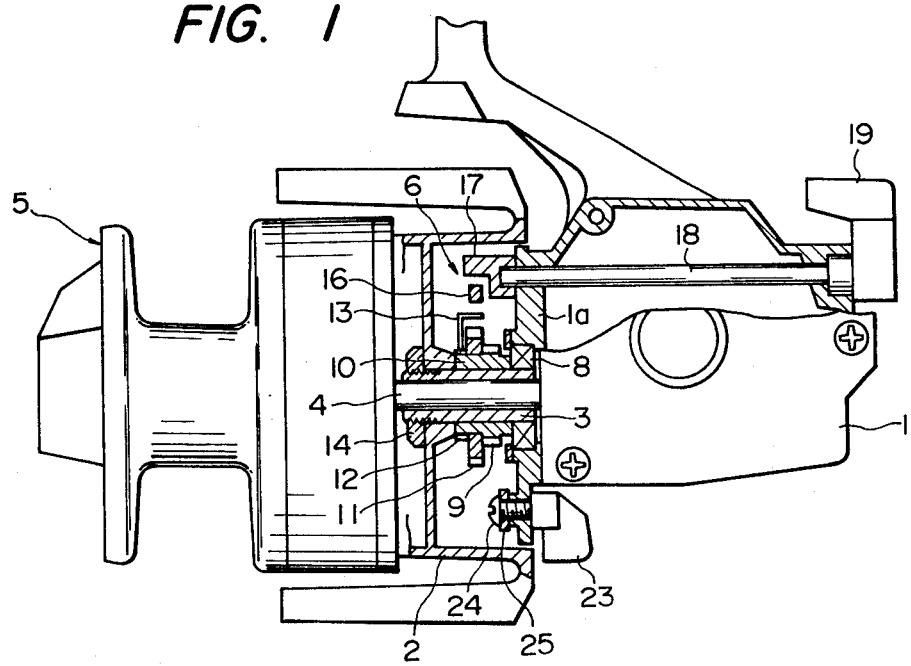
FIG. 1 is a side elevational view, partly in cross section, of a spinning fishing reel having a click device with a line sagging prevention mechanism.

As shown in FIG. 1, a spinning reel in which the present invention is incorporated comprises a reel body 1 supporting a rotatable tubular shaft 3 having a pinion (not shown) on its inner end. A rotor 2 is rotatably supported on the tubular shaft 3 by a nut 14. A spool 5 is mounted on an end of a slidable shaft 4 extending through the tubular shaft 3. Rotative power from a handle (not shown) is transmitted through the pinion meshing with a main gear (not shown) and the tubular shaft 3 to the rotor 2, while at the same time the spool 5 is moved back and forth by an oscillating mechanism (not shown) to wind a fishing line engaging a line guide (not shown) on the rotor 2 onto the spool 5. The rotor 3 is prevented from rotating in a reverse direction or allowed to rotate backwards when an anti-reverse mechanism 6 is turned on or off. By casting the line while the rotor 3 is allowed to rotate in the reverse direction, the rotor 3 rotates backwards to reel out the line from the spool 5.

A click device 7 according to the present invention is separate from the anti-reverse mechanism 6.

Figure 2:
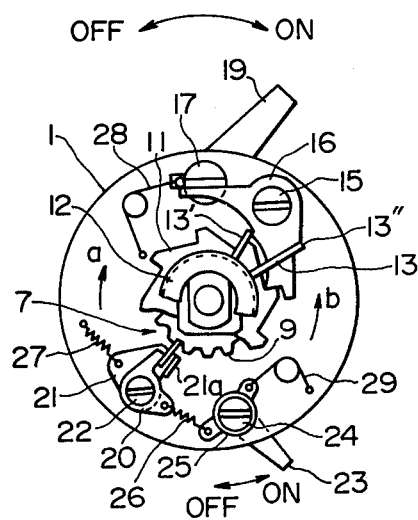
FIGS. 2 through 5 are front elevational views illustrative of operations of the click device and an anti-reverse mechanism.

As shown in FIGS. 1 through 5, the tubular shaft 3 is supported by a bearing 8 on the reel body 1. A click gear 9 and a ratchet holder 10 which are integral with each other are fitted over the tubular shaft 3. Over the ratchet holder 10, there are fitted a ratchet 11 and a guide spring 13 via a spring collar 12. An anti-reverse pawl 16 is angularly movably mounted by a screw 15 on a front plate 1a of the reel body 1. The guide spring 13 has a shorter end portion 13' and a longer end portion 13" which engage inner and outer sides, respectively, of the anti-reverse pawl 16. When the ratchet 11 rotates, the shorter end portion 13' pushes the anti-reverse pawl 16 to rotate counterclockwise as shown in FIG. 2, and the longer end portion 13" pulls the anti-reverse pawl 16 to rotate clockwise.

An anti-reverse lever cam 17 is rotatably mounted by a cam shaft 18 on the reel body 1 and engages one end of the anti-reverse pawl 16. An anti-reverse lever 19 is mounted on an outer end of the cam shaft 18. When the anti-reverse lever 19 is angularly moved, the anti-reverse lever cam 17 is turned to cause the anti-reverse pawl 16 to be angularly moved until the other end thereof engages or disengages the ratchet 11.

The click device 7 has a click pawl 20 and a brake lever 21 rotatably mounted by a screw 22 on the front plate 1a of the reel body 1, the click pawl 20 being engageable with or disengageable from the click gear 9. A switch lever 25 is rotatably mounted by a screw 24 on the front plate 1a and connected to a click control lever 23. A spring 26 is connected between the click pawl 20 and the switch lever 25, so that the click pawl 20 can move in ganged relation to the swithch lever 25. The brake lever 21 has a locking pawl 21a for engaging the click pawl 20 only when the rotor 2 is rotated backwards in the direction of the arrow b (FIG. 2) with the click pawl 20 and the click gear 9 held in engagement. A spring 27 has one end attached to the front plate 1a and the other end coupled to the brake lever 21 to give resistance to angular movement of the click pawl 20 caused when the latter swings over teeth of the click gear 9 upon reverse rotation of the rotor 2.

The anti-reverse lever cam 17 and the switch lever 25 engage ends of springs 28, 29, respectively, attached to the front plate 1a of the reel body 1. The anti-reverse lever cam 17 and the switch lever 25 can be retained selectively in their ON or OFF position beyond the dead points of the springs 28, 29.

In operation, when the anti-reverse lever 19 of the anti-reverse mechanism 6 is in the ON position as shown in FIG. 2, and the rotor 2 is rotated in the forward direction of the arrow a, the anti-reverse pawl 16 is angularly moved counterclockwise by the shorter end portion 13' of the guide spring 13 until the anti-reverse pawl 16 is disengaged from the ratchet 11, whereupon no sound is produced by the ratchet 11 and the anti-reverse pawl 16.

The click device 7 and the anti-reverse mechanism 6 will operate as follows: As shown in FIG. 2, the switch lever 25 is actuated when the click control lever 23 is brought into the ON position. The click pawl 20 is then operated through the spring 26 into engagement with the click gear 9. When the rotor 2 is rotated in the forward direction, clicks are produced by the click pawl 20 and the click gear 9.

Figure 3:
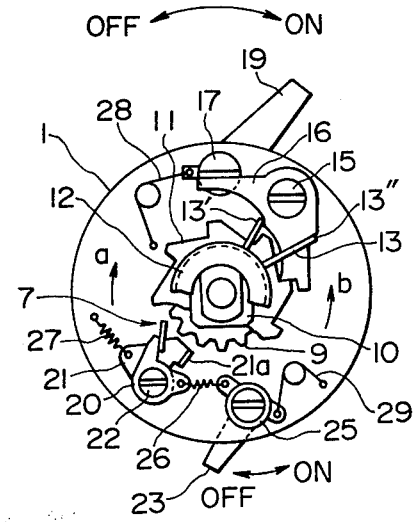

When the click control lever 23 is shifted to the OFF position with the anti-reverse lever 19 in the ON position as shown in FIG. 3, the click pawl 20 is turned counterclockwise out of engagement with the click gear 9 through the switch lever 25 and the spring 26. No clicks are then generated, and hence the rotor 2 can be rotated in the forward direction of the arrow a with no clicks.

When the rotor 2 is rotated in the reverse direction of the arrow b under such a condition, the anti-reverse pawl 16 is pulled radially inwardly by the longer end portion 13" of the guide spring 13 into engagement with the ratchet 11, and no further reverse rotation of the rotor 2 is permitted.

Figure 4:
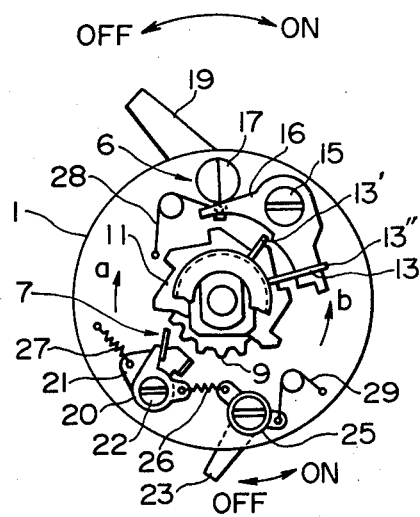

When the anti-reverse lever 19 is moved to the OFF position as illustrated in FIG. 4, the anti-reverse pawl 16 is forcibly disengaged from the ratchet 11 by the anti-reverse lever cam 17. With the click control lever 23 set in the OFF position, the click pawl 20 is brought out of engagement with the click gear 9. Accordingly, no clicks are made when the rotor 2 is rotated in the forward or reverse direction.

Figure 5:
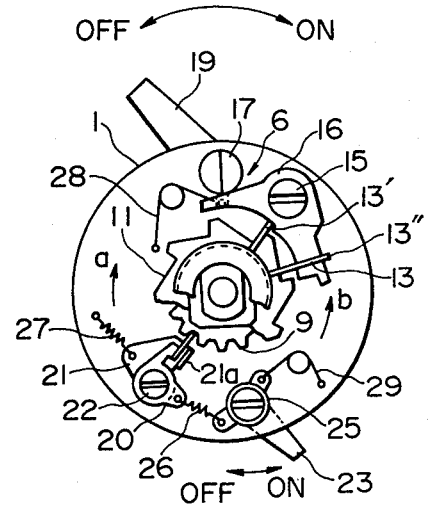

When the anti-reverse lever 19 is in the OFF position and at the same time the click control lever 23 is in the ON position, as shown in FIG. 5, the switch lever 25 and the spring 26 cause the click pawl 29 to turn clockwise into engagement with the click gear 9. In the parts position as shown in FIG. 5, therefore, clicks are produced when the rotor 2 is rotated in either the forward or the reverse direction. During the reverse rotation of the rotor 2, the angular movement of the click pawl 20 is subjected to resistance due to the spring 27 connected to the brake lever 21. Therefore, the click pawl 20 serves to resist the rotation of the rotor 2, so that the rotor 2 will be braked while reeling out the line from the spool 5.

With the arrangement of the invention, the anti-reverse lever 19 of the anti-reverse mechanism 6 and the click control lever 23 of the click device 7 can selectively be brought to their ON or OFF position so that a click may or may not be given off when the rotor 2 is rotated in the forward direction to wind up the like or in the reverse direction to reel out the line. The angler therefore can fish with a click made or not made as necessary or desired. Furthermore, when the rotor 2 rotates in the reverse direction with the anti-reverse lever 19 in the OFF position, the angler may set the click control position 23 in the ON position to give off a click and at the same time to cause the click pawl 20 to resist the rotation of the click gear 9 under the resiliency of the spring 27 acting on the brake lever 21. The slowed-down reverse rotation of the rotor 2 prevents the line from sagging which would otherwise be caused if the rotor 2 idled due to inertia thereof and of the handle after the line was reeled out and cast. This is especially advantageous for trolling.

Although a certain preferred embodiment has been shown and described, it should be understood that many changes and modifications may be made therein without departing from the scope of the appended claims.

What is claimed is:

1. A spinning reel comprising:
   (a) a reel body having a plate and a tubular shaft rotatably mounted thereon;
   (b) a rotor rotatably supported on said tubular shaft and rotatable in opposite directions;
   (c) an anti-reverse mechanism mounted on said plate for selectively preventing said rotor from rotating in one of said opposite directions; and
   (d) a click device comprising a click gear rotatably mounted on said tubular shaft for rotation with said rotor, a click pawl pivotably mounted on said plate for engagement with said click gear to produce clicks, a switch lever pivotably mounted on said plate, a brake lever pivotably mounted on said plate and engageable with said click pawl, a first spring connected between said click pawl and said switch lever for enabling said click pawl to engage with and disengage from said click gear in response to actuation of said switch lever, and a second spring connected between said plate and said brake lever for causing said brake lever to engage said click pawl when said rotor rotates in said one of opposite directions while said click pawl engages said click gear, whereby said rotor can be resisted in its rotation in said one of opposite directions.

2. A spinning reel according to claim 1, further comprising common pivot means for said click pawl and said brake lever whereby said click pawl and said brake lever are coaxially mounted on said plate.

3. A spinning reel according to claim 1, including a third spring acting between said plate and said switch lever for selectively retaining said switch lever in two angularly spaced positions for causing said click pawl to engage with and disengage from, respectively, said click gear.

4. A spinning reel according to claim 1 further comprising an operating lever pivotally mounted on said plate independent of said switch lever for controlling said anti-reverse mechanism.

* * * * *